United States Patent
Xie et al.

(10) Patent No.: US 11,310,516 B2
(45) Date of Patent: Apr. 19, 2022

(54) ADAPTIVE BITRATE ALGORITHM WITH CROSS-USER BASED VIEWPORT PREDICTION FOR 360-DEGREE VIDEO STREAMING

(71) Applicant: HULU, LLC, Santa Monica, CA (US)

(72) Inventors: Lan Xie, Beijing (CN); Shenglan Huang, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 16/717,308

(22) Filed: Dec. 17, 2019

(65) Prior Publication Data

US 2020/0204810 A1    Jun. 25, 2020

Related U.S. Application Data

(60) Provisional application No. 62/783,983, filed on Dec. 21, 2018.

(51) Int. Cl.
| | | |
|---|---|---|
| *H04N 19/115* | (2014.01) | |
| *H04N 19/146* | (2014.01) | |
| *H04N 19/174* | (2014.01) | |
| *H04N 19/196* | (2014.01) | |

(52) U.S. Cl.
CPC ......... *H04N 19/196* (2014.11); *H04N 19/115* (2014.11); *H04N 19/146* (2014.11); *H04N 19/174* (2014.11)

(58) Field of Classification Search
None
See application file for complete search history.

(56) References Cited

U.S. PATENT DOCUMENTS

| | | | | |
|---|---|---|---|---|
| 6,611,624 | B1* | 8/2003 | Zhang | H04N 21/23406 370/498 |
| 7,024,046 | B2* | 4/2006 | Dekel | H04N 1/3873 375/240.19 |
| 7,936,818 | B2* | 5/2011 | Jayant | H04N 19/00 375/240.05 |
| 8,402,351 | B1* | 3/2013 | Yang | H03M 13/3746 714/779 |
| 8,531,321 | B1* | 9/2013 | Rossato | H04N 19/13 341/51 |
| 9,253,229 | B1* | 2/2016 | Strothmann | H04N 21/2662 |
| 9,408,037 | B1* | 8/2016 | Alizadeh-Shabdiz | H04W 4/029 |
| 10,062,414 | B1* | 8/2018 | Westphal | H04N 21/23406 |
| 10,595,069 | B2* | 3/2020 | Swaminathan | H04L 65/605 |
| 2006/0227867 | A1* | 10/2006 | Winger | H04N 19/139 375/240.03 |

(Continued)

OTHER PUBLICATIONS

Search Report IP.com.*

*Primary Examiner* — Mohammad J Rahman
(74) *Attorney, Agent, or Firm* — Kwan & Olynick LLP

(57) ABSTRACT

In some embodiments, a method receives a probability distribution of a likelihood that a user might view one or more tiles in one or more segments of a video. The video is encoded in different profiles that are associated with different bitrates. An available bandwidth is determined. Then, the method selects a profile for each tile in a segment of the video based on the available bandwidth and the probability distribution for the tiles and sends a request for a respective profile for each tile for playback of the segment of the video.

21 Claims, 8 Drawing Sheets

(56) References Cited

U.S. PATENT DOCUMENTS

| | | | |
|---|---|---|---|
| 2006/0235883 A1* | 10/2006 | Krebs | G06F 17/3002 |
| 2007/0036222 A1* | 2/2007 | Srinivasan | H04N 19/14 |
| | | | 375/240.18 |
| 2007/0121728 A1* | 5/2007 | Wang | H04N 19/19 |
| | | | 375/240.18 |
| 2009/0182889 A1* | 7/2009 | Hurst | H04L 65/4069 |
| | | | 709/231 |
| 2010/0135637 A1* | 6/2010 | McDermott | H04N 5/76 |
| | | | 386/344 |
| 2012/0154619 A1* | 6/2012 | Lee | G06F 3/013 |
| | | | 348/222.1 |
| 2013/0216212 A1* | 8/2013 | Hurst | H04N 21/44209 |
| | | | 386/353 |
| 2014/0086333 A1* | 3/2014 | Wang | H04N 21/8451 |
| | | | 375/240.25 |
| 2014/0213298 A1* | 7/2014 | Marti | H04W 4/023 |
| | | | 455/456.3 |
| 2014/0282768 A1* | 9/2014 | Michael | H04N 21/23106 |
| | | | 725/93 |
| 2014/0321528 A1* | 10/2014 | Jung | H04N 19/139 |
| | | | 375/240.02 |
| 2015/0208095 A1* | 7/2015 | Schierl | H04N 19/70 |
| | | | 375/240.28 |
| 2015/0304667 A1* | 10/2015 | Suehring | H04N 19/30 |
| | | | 375/240.02 |
| 2016/0057441 A1* | 2/2016 | Skupin | H04N 19/55 |
| | | | 375/240.25 |
| 2016/0150241 A1* | 5/2016 | Hirabayashi | H04N 21/2358 |
| | | | 375/240.21 |
| 2017/0054751 A1* | 2/2017 | Schneider | H04L 63/1425 |
| 2017/0366812 A1* | 12/2017 | Abbas | H04N 5/23238 |
| 2018/0027240 A1* | 1/2018 | Huang | H04N 19/91 |
| | | | 375/240.12 |
| 2018/0081171 A1* | 3/2018 | Park | H04N 19/895 |
| 2018/0089091 A1* | 3/2018 | Akenine-Moller | G06T 1/20 |
| 2018/0146198 A1* | 5/2018 | Atluru | H04N 19/597 |
| 2018/0160160 A1* | 6/2018 | Swaminathan | H04N 21/8456 |
| 2019/0109883 A1* | 4/2019 | Sugunan | H04N 21/226 |
| 2019/0238860 A1* | 8/2019 | Lim | H04N 19/184 |
| 2019/0327467 A1* | 10/2019 | Chou | H04N 19/176 |
| 2019/0356894 A1* | 11/2019 | Oh | H04N 21/234345 |
| 2019/0362151 A1* | 11/2019 | Stokking | H04N 21/6371 |
| 2020/0050884 A1* | 2/2020 | Han | H04N 13/117 |
| 2020/0053392 A1* | 2/2020 | Hannuksela | H04N 19/167 |

* cited by examiner

ADAPTIVE BITRATE ALGORITHM WITH CROSS-USER BASED VIEWPORT PREDICTION FOR 360-DEGREE VIDEO STREAMING

CROSS REFERENCE TO RELATED APPLICATIONS

Pursuant to 35 U.S.C. § 119(e), this application is entitled to and claims the benefit of the filing date of U.S. Provisional App. No. 62/783,983 filed Dec. 21, 2018, the content of which is incorporated herein by reference in its entirety for all purposes.

BACKGROUND

Some videos may be 360-degree virtual reality (VR) content. A common format for encoding 360-degree virtual reality content uses tiles. Similar to classic map projections used in cartography, the tiles are used to represent data from the surface of an object. The tiles are encoded and sent to a client device. However, the high bitrate and resolution characteristics of 360-degree videos hinder their widespread delivery over the Internet. Also, in a bandwidth restricted network, the perceptual quality of 360-degree video is extremely low.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Described herein are techniques for a video delivery system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments improve the quality of streaming of a video, such as a 360-degree video stream. The 360-degree video may be an omni-directional video or virtual reality video, such as tile-based 360-degree video. The 360-degree video may not provide an entire 360-degrees of video, but at least some video may be located outside of a viewport of a user that is showing video to the user. For example, some embodiments provide a novel cross-user-based viewport prediction method and an optimal adaptive bitrate algorithm that uses the cross-user-based viewport prediction. In tile-based 360-degree video streaming, the video is spatially partitioned into tiles and temporally partitioned into segments. Further, each segment can be encoded into multiple bitrate versions with tiles being encoded at different bitrates. When playing a 360-degree video, a media player periodically conducts two aspects of prediction to improve the user experience: prediction of user's future viewport and prediction of user's future bandwidth. The cross-user-based viewport prediction improves the prediction precision by predicting the future viewport location. Taking into consideration the viewport prediction result, the adaptive bitrate process can choose the optimal bitrate for tiles, such as different bitrates for some tiles, to maximize the overall quality of the video.

System Overview

Figure 1:
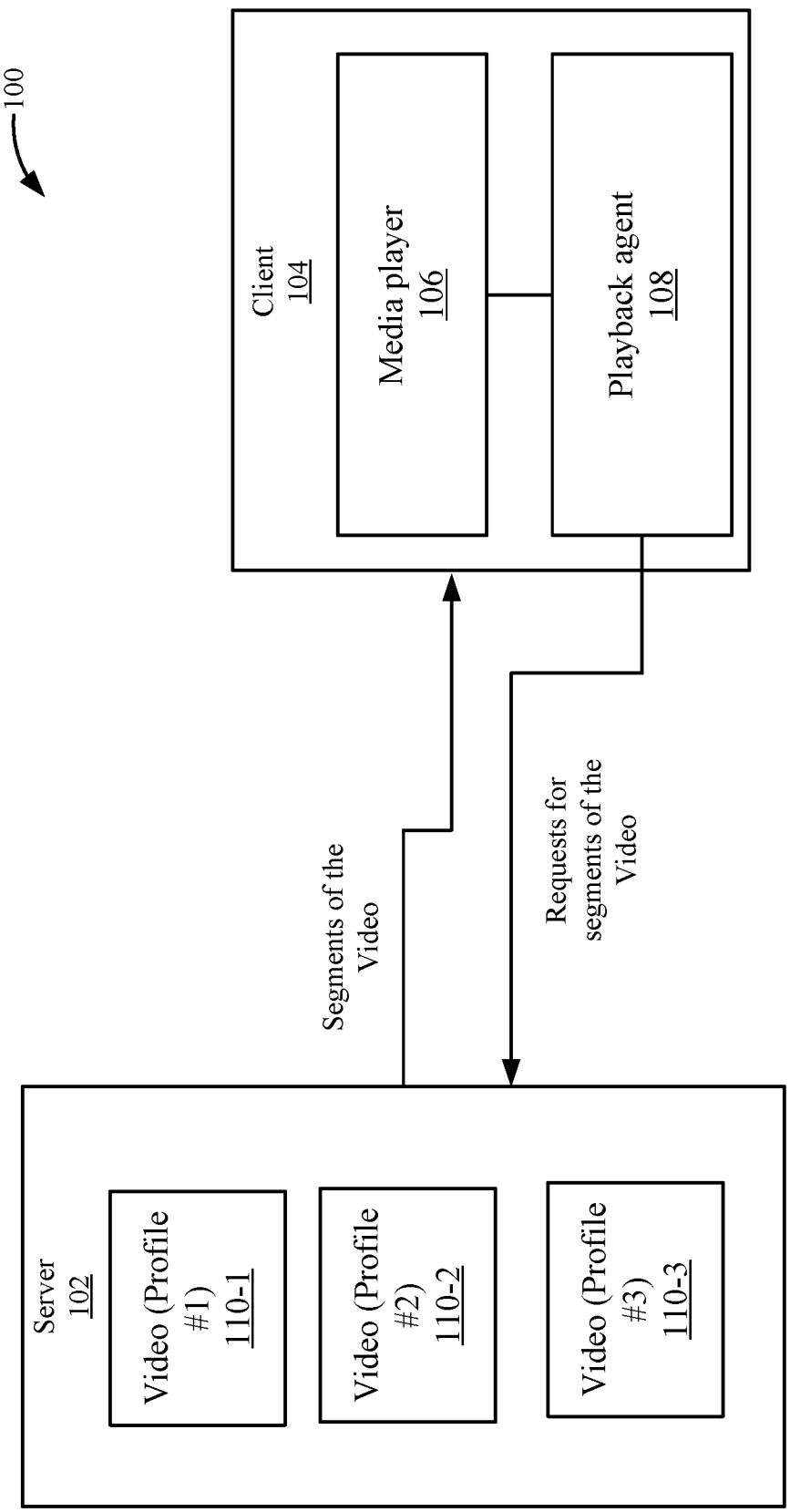
FIG. 1 depicts a simplified system for sending videos according to some embodiments.

FIG. 1 depicts a simplified system 100 for sending videos according to some embodiments. System 100 includes a server 102 and a client 104. Although one instance of server 102 and client 104 are shown, multiple instances of server 102 and client 104 may be used.

In one example, server 102 may be able to deliver various videos 110 that have been (or will be) encoded in multiple profiles. Videos 110 may be content, such as video and/or audio content. Also, videos 110 may be 360-degree video, which allows a user to view the video in 360 degrees. A video 110 may be encoded into different profiles, such as at different quality levels that affect the bitrate of the associated video. A video 110 that is encoded in a higher bitrate profile may use more bandwidth to send a segment of video than a video encoded in a lower bitrate profile. The lower bitrate profile may be perceived as a lower video quality than the higher profile and uses less bandwidth to transmit.

A video is segmented into multiple segments that last for a period of time, such as several seconds. An encoder encodes the segments of video 110 into multiple profiles in different versions of the video. As shown, a video 110 is stored in different versions as video 110-1 (e.g., a high bitrate profile #1), video 110-2 (e.g., a medium bitrate profile #2), ..., and video 110-3 (e.g., a low bitrate profile #3). The different profiles provide videos at different bitrate levels. For example, a profile may encode video 110 differently, such as in a high bitrate, medium bitrate, and a low bitrate. As bitrate decreases, the perceived quality level may be lower due to a reduction in resolution. Each video 110 for each profile may also include a number of tiles for each segment. Each tile may be of a different quality even within the same profile. Although the above profiles are discussed, other profiles that include different characteristics may be used. The different characteristics may result in a different number of bytes that are sent and a different amount of bandwidth that is needed to send the video.

Client 104 may include various user devices, such as cellular phones, set top boxes, streaming devices, personal computers, tablet computers, etc. Client 104 may include a media player 106 that can play video 110. A media player 106 may use a protocol, such as Dynamic Adaptive Streaming over HyperText Transfer Protocol (DASH) or HyperText Transfer Protocol (HTTP) Live Streaming (HLS) to request segments. Then, media player 106 may play video and/or audio.

A playback agent 108 may control various aspects of the video playback. For example, playback agent 108 may determine when to switch profiles when requesting segments of video 110 based on the adaptive bitrate streaming process. Adaptive bitrate streaming (ABR) allows a media player 106 to switch between different profiles to improve the playback experience. At certain times, media player 106 may experience variations in available bandwidth; for example, the available bandwidth may decrease. When this occurs, if a profile that requires a large amount of bandwidth to send a segment is currently being used, media player 106 may experience playback issues, such as re-buffering. Re-buffering is when video playback stalls in the middle of playback due to a buffer underrun, which may occur, for instance, where there is not enough video in the buffer to support playback of the video. That is, the video is not being received fast enough to fill the buffer for uninterrupted playback. Using adaptive bitrate streaming, media player 106 may switch to a profile that requires less bandwidth to transmit a segment. This may alleviate the playback issues associated with re-buffering because more video may be received in the same amount of time, but the video quality may suffer because the profile selected may be for a video that has been encoded with a lower quality.

Figure 2:
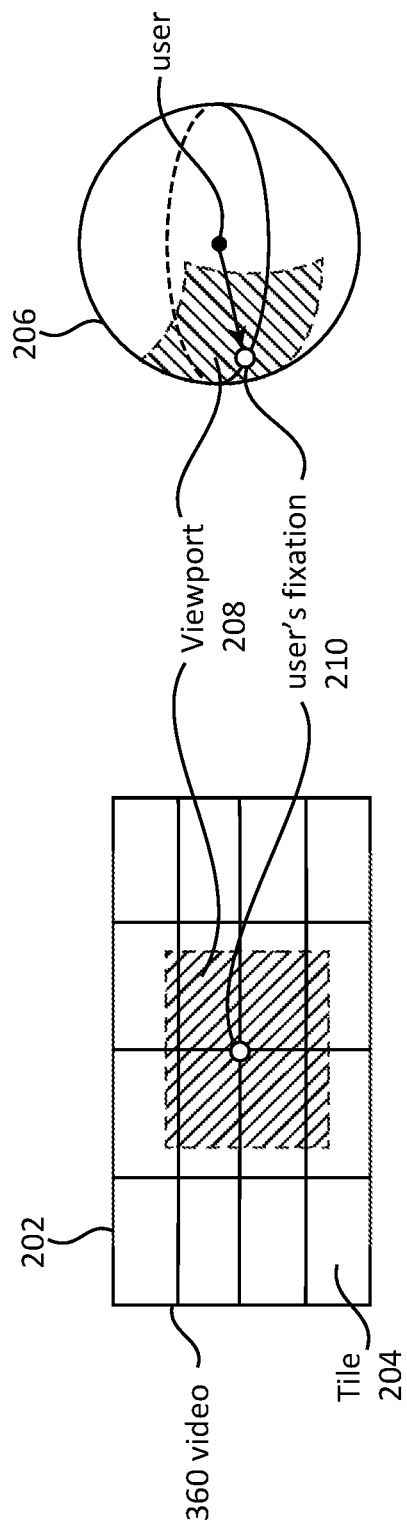
FIG. 2 depicts an example of a tile-based streaming system according to some embodiments.

Adaptive bitrate streaming may be extended to deliver high quality 360-degree video. One method of delivering 360-degree video is a tile-based streaming framework. Also, as will be described in more detail below, playback agent 108 may determine different bitrates to request for different tiles in a segment. FIG. 2 depicts an example of tile-based streaming system according to some embodiments. In tile-based streaming, each temporal video segment is composed of several spatial tiles 204 that can be independently encoded/decoded. Tiles 204 represent different portions of a 360-degree view of the video. Tiles 204 may arrange the 360-degree view on a sheet 202 that can be encoded. Tiles 204 can then be decoded when presented to a user by placing the tiles 204 on an object, such as a sphere or a cube structure.

When a user is viewing the video, the user can only view a portion of the 360-degree video. For example, the user may be placed within a structure 206, such as a sphere. The user can then view the 360-degree video by moving a viewport 208. Viewport 208 may be determined based on a user's fixation 210, which may be a point of focus. Generally, the fixation may be around a center point of viewpoint 208 or substantially at the center. Viewport 208 is then formed around fixation 210. As shown, only a portion of the tiles 204 that correspond to viewport 208 are shown to the user.

Before downloading each of the segments, playback agent 108 may select or generate the bitrate of each tile. Playback agent 108 may select the bitrate in such a way that a higher bitrate (e.g., a higher quality) is used within the tiles 204 that may cover user's viewport 208 while other tiles 204 are delivered in a lower quality. Also, playback agent 108 may request higher bitrates for tiles 204 that are closer to viewport 208 compared to tiles farther away from viewport 208. As a result, media player 106 displays higher quality video in the user's viewport 208. To provide the higher quality video in the user's viewport 208, some embodiments predict which tiles 204 may be displayed as in the user's viewport 208 and then request those tiles 204 with a higher quality. The higher quality may mean a higher bitrate for each tile associated with viewport 208. However, the video quality may be adjusted by other characteristics. For example, even if tiles 204 have same bitrate, the quality of the tiles 204 can be different. The quality can be different because tiles 204 may have different content, such as a first tile has content that has smooth texture and a second tile has content with a complex texture. If the encoder uses same amount of data (bits) to compress these two tiles 204, the second tile will have a lower quality.

Currently, motion-based and content-based viewport prediction methods have low precision, especially for long-term prediction. Specifically, a motion-based method only considers the single user's head motion and is unaware of the video content. As a result, the viewport prediction could easily be biased when predicting long-term future. The content-based method applies traditional object detection algorithms on 360-degree videos to find a region of interest (ROI). However, it is computationally intensive and may have poor accuracy. This is because predicting ROI on 360-degree videos is inherently different and more challenging compared to planar video. Accordingly, some embodiments use a cross-user-based viewport prediction process and an adaptive bitrate process for tile-based 360-degree video streaming to improve viewport prediction precision and hence enhance the perceptual video quality. The process involves predicting the future viewport position for a user. Then, the process requests higher quality (e.g., higher bitrate) tiles based on the future viewport position. The problem may be more complicated than selecting the viewport position as a probability distribution may be used to determine the quality levels to select for all tiles in a sheet 202.

Cross-User-Based Viewport Prediction System

Figure 3:
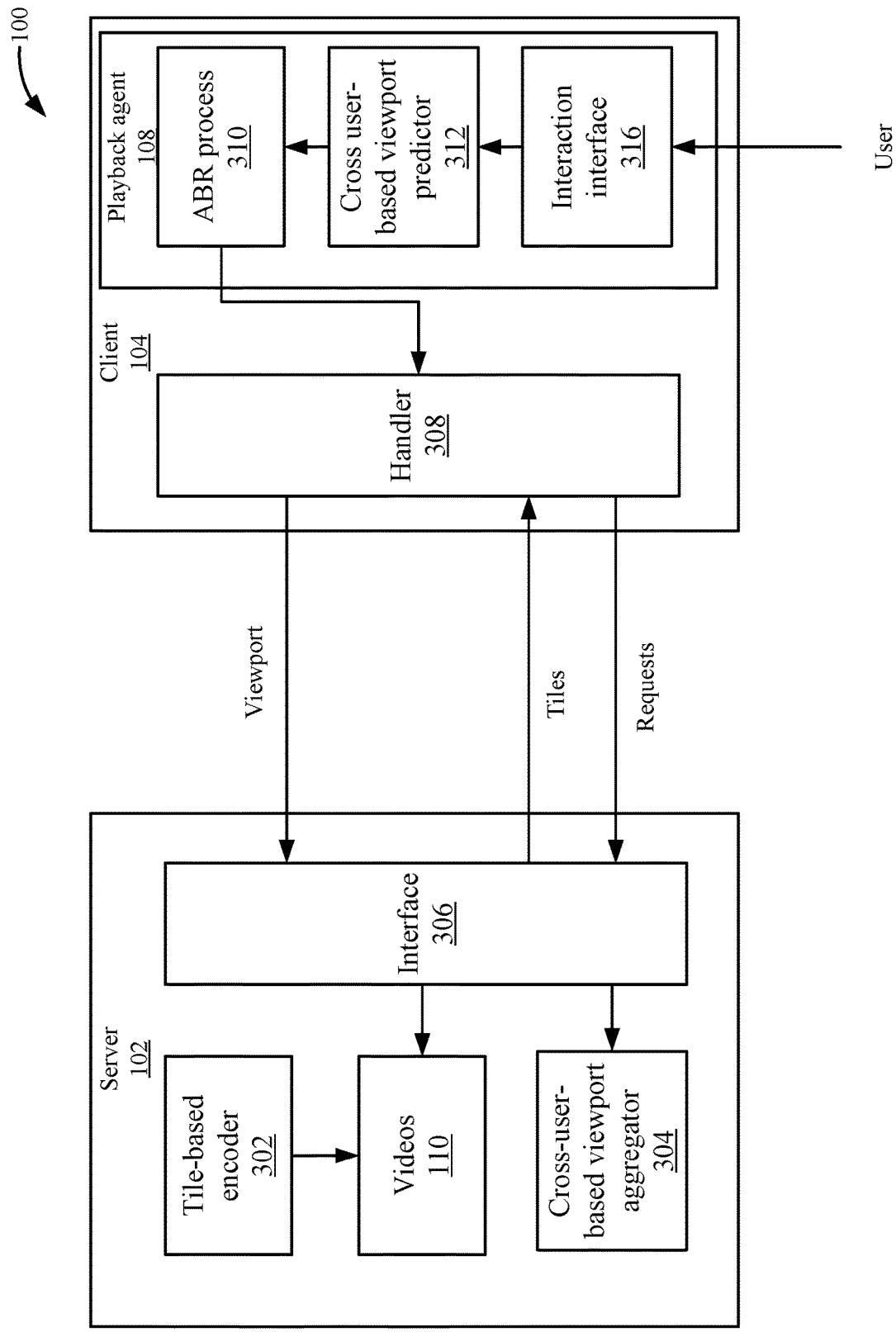
FIG. 3 depicts a more detailed example of a system that supports cross-user-based viewport prediction according to some embodiments.

FIG. 3 depicts a more detailed example of system 100 that supports cross-user-based viewport prediction according to some embodiments. Server 102 includes a tile-based encoder 302, videos 110, a cross-user-based viewport aggregator 304, and an interface 306. Server 102 may perform tile-based encoding and cross-user-based viewport aggregation.

Figure 4A:
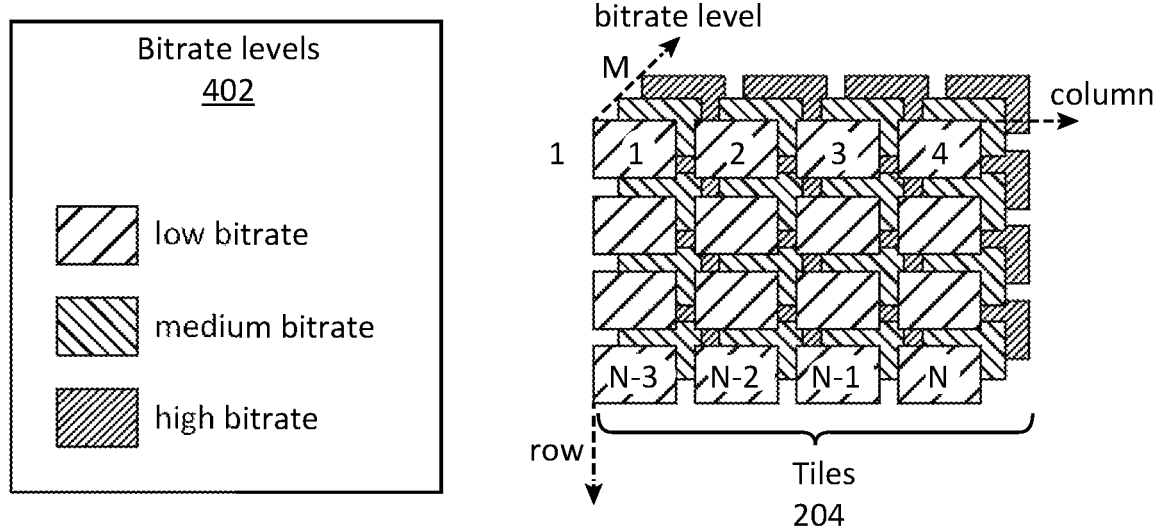
FIG. 4A depicts the tile-based encoding process using multiple bitrates according to some embodiments.

In tile-based encoding, server 102 encodes the 360-degree video into multiple profiles, such as bitrates, based on the tile positions. FIG. 4A depicts the tile-based encoding process using multiple bitrates according to some embodiments. A number of bitrate levels 402 is M and a number of tiles 204 is N. As shown at 402, tile-based encoder 302 may encode video 110 at different bitrates, such as a low bitrate, a medium bitrate, and a high bitrate. Each segment of video may include N tiles 204. Tile based encoder 302 encodes each the N tiles 204 or each segment in each of the M bitrates 402.

Referring back to FIG. 3, for cross-user-based viewport aggregation, cross-user-based viewport aggregator 304 collects information needed to generate a cross-user-based prediction for a current user's viewport 208. For example, cross-user-based viewport aggregator 304 collects a current fixation of the user, a history of the user's fixations, and/or the corresponding timestamps for the past fixations during a 360-degree video session. Further, server 102 may use other users' fixations. For example, cross-user-based viewport aggregator 304 may use the history of other users' fixations only. However, cross-user-based viewport aggregator 304 may also take into account the current fixation of a user. Then, cross-user-based viewport aggregator 304 calculates a cross-user viewport probability distribution for video segments, such as for each video segment in the video, for each video segment in a future time period, or for all future video segments in the video. That is, if a user is watching a video around the two-minute mark, cross-user-based viewport aggregator 304 calculates a cross-user viewport probability distribution for video segments after the two-minute mark, such as the segments that are one minute after the two-minute mark. This method may dynamically calculate the cross-user viewport probability distribution during playback of the video. Alternatively, cross-user-based viewport aggregator 304 calculates a cross-user viewport probability distribution for all video segments before playback changes.

The probability distribution may predict a probability (e.g., a likelihood) that a user may view one or more of tiles 204 in video segments in a future time period. The probability distribution may represent any value that indicates different levels of likelihood. The cross-user portion may use information from both the current user and other users of the service to perform the prediction. That is, information from where other users viewed tiles 204 in the video may be used to predict which tiles 204 the current user may view next. Using other users' viewing information may improve the prediction because if certain tiles 204 are typically viewed by users, then this may increase the probability a current user may view those tiles 204.

To use the cross-user viewport probability distribution at client 104, when starting a 360-degree video session, a handler 308 of client 104 may send a request for metadata to interface 306 of server 102. The metadata may include the cross-user viewport probability distribution of at least a portion of the video segments of the video (e.g., all of them), the bitrate of each tile, and a quality measurement of each tile. Then, a cross-user-based viewport predictor 312 extracts the viewport probability distribution of a specific segment.

Using the viewport probability distribution, an ABR process 310 performs an optimal adaptive bitrate selection process to select the bitrate of each tile 204. Although client 104 is described as performing this function, in other embodiments, server 102 may determine the bitrates and send the bitrates to select to client 104.

Figure 4B:
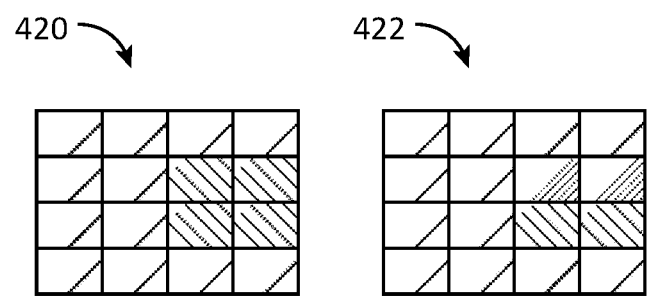
FIG. 4B depicts different examples of adaptive bitrate selection for tiles according to some embodiments.

FIG. 4B depicts different examples of adaptive bitrate selection for tiles 204 according to some embodiments. At 420, a first example of a video segment is shown, and a second example of the video segment is shown at 422. At 420, ABR process 310 may request the low bitrate tiles 204 for a first portion of the video segment and medium bitrate tiles 204 for a second portion of the video segment. As shown, ABR process 310 selects twelve low bitrate tiles 204 and four medium bitrate tiles 204. In this case, ABR process 310 may determine that it is more likely that the user may view the four medium bitrate tiles 204 than the twelve low bitrate tiles 204.

At 422, ABR process 310 may request more than two bitrates, such as the low bitrate tiles 204 for a first portion of the video segment, medium bitrate tiles 204 for a second portion of the video segment, and high bitrate tiles 204 for a third portion of the video segment. As shown, ABR process 310 selects twelve low bitrate tiles 204, two medium bitrate tiles 204, and two high bitrate tiles 204. ABR process 310 may determine that it is more likely that the user may view the two high bitrate tiles 204 and a little less likely the user may view the two medium bitrate tiles 204.

After performing the selection, media player 106 requests a video segment at the specific bitrates selected, such as by using an HTTP GET request. Also, media player 106 reports the user's fixation and corresponding timestamp using a message, such as an HTTP POST message.

Figure 5:
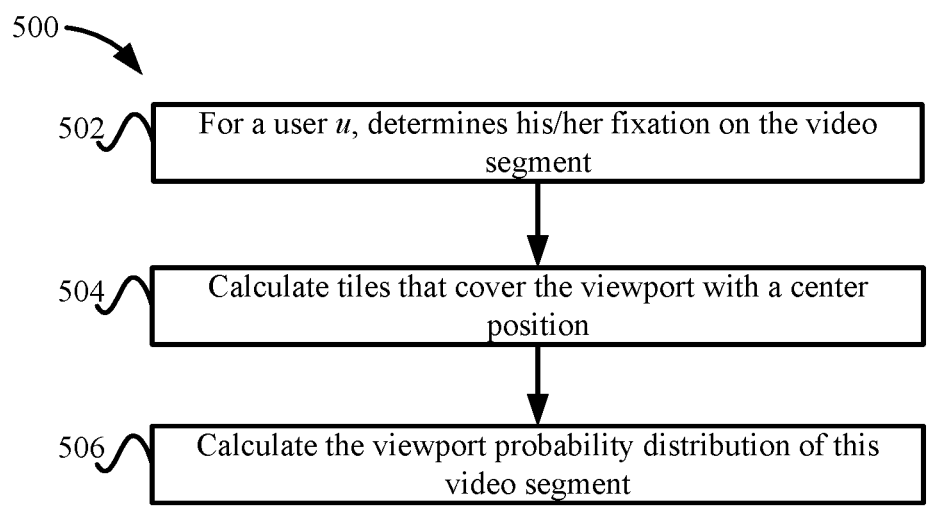
FIG. 5 depicts a simplified flowchart of a method for calculating the cross-user-based viewport probability distribution according to some embodiments.

Referring back to FIG. 3, to calculate the cross-user-based viewport prediction, cross-user-based viewport aggregator 304 collects other users' historical fixations during 360-degree video sessions for the same video (e.g., from sessions before the current playback session). Specifically, for the users that have watched the same video, cross-user-based viewport aggregator 304 calculates the viewport probability distribution for each video segment. For a specific video segment, cross-user-based viewport aggregator 304 may perform the following process. FIG. 5 depicts a simplified flowchart 500 of a method for calculating the cross-user-based viewport probability distribution according to some embodiments. The probability distribution may be different probabilities that a user might view a tile in each video segment of a video. At 502, for a user u, cross-user-based viewport aggregator 304 determines the user's fixation on the video segment, which may be denoted as $f_u=(x_u, y_u, z_u)$, which is a spherical coordinate. Cross-user-based viewport aggregator 304 may aggregate the fixations for multiple users. For example, in FIG. 3, an interaction interface 316 receives user input to move a viewport 208.

At 504, cross-user-based viewport aggregator 304 calculates tiles 204 that cover the viewport 208 with a center $f_u$. Cross-user-based viewport aggregator 304 may calculate the center using a forward projection. A 360-degree video is captured in a spherical pattern. Before the 360 video is processed and transmitted, the points on the sphere are warped and mapped into a planar pattern. This process is called forward projection. At the client side, when the transmitted video is being rendered and displayed, the video will be warped back to spherical pattern. This is called backward projection. In the forward projection, the number of tiles 204 is defined as N. Thus, a vector $V_u=\{v_{u,1}, \ldots, v_{u,i}, \ldots, v_{u,N}\}$ represents whether the i-th tile is watched by the user. If $v_i=1$, it means the i-th tile is watched by the user; otherwise, $v_i=0$.

At 506, cross-user-based viewport aggregator 304 calculates the viewport probability distribution $P=\{p_1, \ldots, p_i, \ldots, p_N\}$ of this video segment. In some embodiments, cross-user-based viewport aggregator 304 uses the following with a normalization of w:

$$p_i = \frac{w_i}{\sum_{i=1}^{N} w_i}$$

where $p_i$ is the probability distribution, and w is the normalization variable. The normalization may adjust the counts to values between a range. The probability distribution may list probabilities for each tile 204 based on the characteristics of how the user viewed video segments, such as which tiles 204 were viewed using a user's viewport 208.

Figure 6:
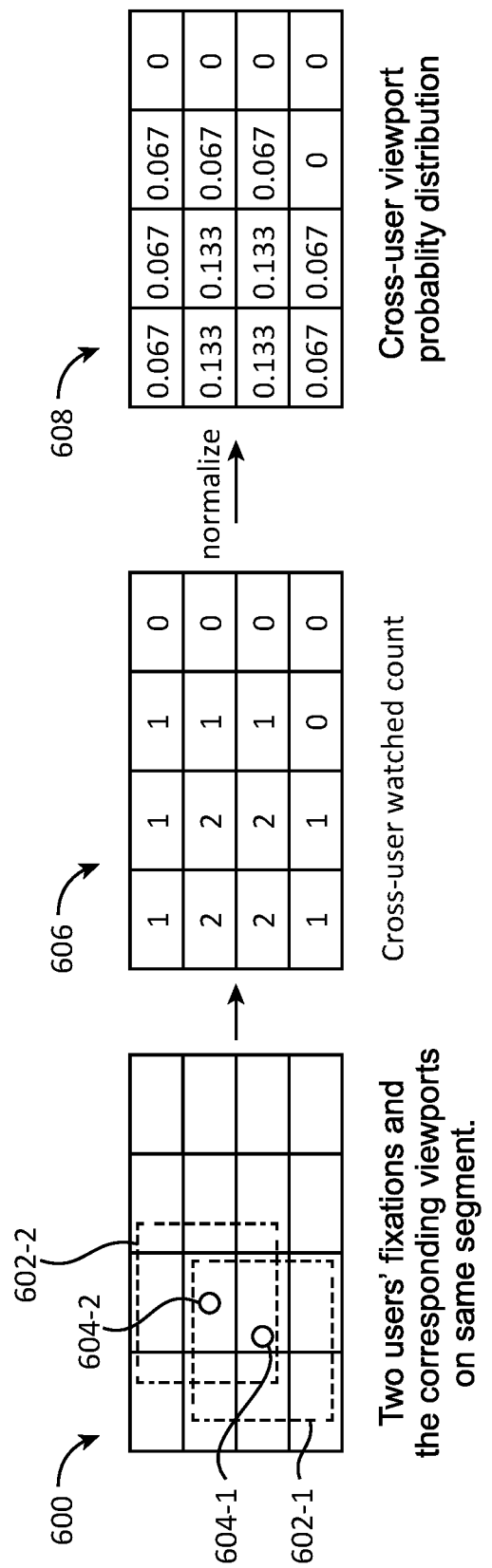
FIG. 6 depicts an example of calculating the viewport probability distribution according to some embodiments.

FIG. 6 depicts an example of calculating the viewport probability distribution according to some embodiments. Two users' fixations are shown in a video segment 600 at different positions. For example, a first user's fixation is at 602-1 and a second user's fixation is at 602-2 for the same video segment. The two fixations 602-1 and 602-2 cover at least a portion of different tiles 204, which may mean a center position 604-1 for fixation 602-1 and a center position 604-2 are at different positions. Although only two users' fixations are shown, more users' fixations may be used.

At 606, cross-user-based viewport aggregator 304 calculates a cross-user watch count by adding counts in tiles 204 that are associated with a viewport of a user. The counts represent a number of times a user's fixation viewed a tile 204 in a video segment. For example, some tiles 204 have a count of "2" when both users' viewport cover those tiles 204. However, some tiles 204 have a count of "1" when only one of the user's viewport cover those tiles 204. Also, some tiles 204 have a count of "0" when no users' viewports have viewed those tiles 204. It is noted that the counts may increase as viewport positions of more users are evaluated.

Server 102 may normalize the counts into a probability distribution using the above equation above, but normalization may not be used. The normalization may adjust the counts to values between a range, such as [0,1] in the example, shown at 608. As shown, each tile is associated with a value between 0 and 1. Although using counts are described, other methods of generating the probability distribution may also be appreciated.

Using Quality to Select Profiles for Tiles

The video quality can vary from different content. Even if the tiles 204 have same bitrate, the quality of the tiles 204 can be different. Therefore, in the tile selection, ABR process 310 in FIG. 3 may consider both the bitrate and the quality of tiles 204. ABR process 310 may select the bitrate levels for each tile 204 by maximizing the overall quality under a bandwidth constraint. For example, ABR process 310 may assign a bandwidth to each tile 204 that can maximize the weighted quality (e.g., the weight is the viewing probability). To select the profiles of tiles 204, ABR process 310 can select the profiles for two tiles in a simplified example. The weights of these two tiles are 0.4 and 0.6. The available profiles for each tile are {100, 200, 300, 400} kbps, and the corresponding qualities of these profiles are {10, 15, 16, 17}, respectively. The bandwidth constraint is 500 kbps. If ABR process 310 uses the greedy algorithm, ABR process 310 ranks the tiles according to their weights. That is, ABR process 310 assigns the highest profile to the tile with highest weight in the first place, and then selects the profile for the second tile. The results will be: select 400 kbps for the tile with weight 0.6 and 100 kbps for the tile with weight 0.4. However, the weighted quality is 17*0.6+10*0.4=14.2. But the optimal solution is: select 300 kbps for the tile with weight 0.6 and select 200 kbps for the tile with weight 0.4. The weighted quality is 16*0.6+15*0.4=15.6, which is larger than 14.2. However, although the above is described, ABR process 310 may also use other processes, such as a greedy algorithm that assigns the highest quality to the tiles with high viewing probabilities.

In some embodiments, the optimal adaptive bitrate selection problem can be defined as:

$$\max_l \sum_i p_i \cdot q_i(l_i)$$

$$\text{s.t.} \sum_i r_i(l_i) \leq C$$

-continued $$r_i(l_i) \in \{R_1, R_2, \ldots, R_M\}$$

$$i \in [1, N]$$

$$l_i \in [1, M]$$

In the above, the index i is the index of a tile 204. The variable $l = \{l_1, \ldots, l_i, \ldots, l_N\}$ is the selected bitrate level for all tiles 204 that is the output of ABR process 310. The variable $q_i(l_i)$ is the quality of i-th tile in the $l_i$ bitrate level. The variable $r_i(l_i)$ is the bitrate of i-th tile in the $l_i$ bitrate level. ABR process 310 can calculate a maximum of the probability distribution times the quality of i-th tile in the $l_i$ bitrate level. The maximum of the probability distribution times the quality of i-th tile in the $l_i$ bitrate level is subject to (s.t.) a first condition limits the sum of bitrate variable $r_i(l_i)$ to not exceed bandwidth C. Also, the maximum of the probability distribution times the quality of i-th tile in the $l_i$ bitrate level is subject to a second condition represents the available bitrate set $\{R_1, R_2, \ldots, R_M\}$ with N bitrates and M quality levels. Note that the variable $p_i$ is obtained from cross-user-based viewport prediction. The probability modifies the quality such that tiles 204 that are predicted to be viewed by the user with a higher quality may be selected with a higher bitrate. The media player can obtain the quality set $\{q_i(l_i)\}$ and bitrate set $\{r_i(l_i)\}$ from metadata, such as from a manifest file at the beginning of a playback session.

In some embodiments, ABR process 310 uses an optimization process such as a Multiple-choice Knapsack Problem to select the bitrates, but other optimization processes may be used. In the Multiple-choice Knapsack Problem, the number of variables to be decided is N, e.g., the number of tiles 204. Each variable has M choices and M corresponding values, e.g., the number of bitrate levels and the corresponding quality. Also, each variable has a weight, e.g., the viewport probability. The process selects one of the values for each variable that maximizes the total weighted values under a given budget C, e.g., the available bandwidth being currently experienced by client 102 to stream the video.

The process solves each sub-problem when performing the optimization. The sub-problem is defined as $S(i,c)$, where $i \in [1,N], c \in [0,C]$, where i stands for the index of tile of an integer from 1 to N; and c stands for the estimated available bandwidth and is an integer from 1 to C. Consequently, ABR process 310 obtains the result for the completed problem $S(N,C)$ by solving each sub-problem. A revenue table K is used to record the maximum value that can be reached of each sub-problem and is used to determine the optimization result. ABR process 310 may update the revenue table is updated as:

$$\mathcal{K}[i][c] = \max_{j \in [1,M]} \{\mathcal{K}[i-1][c - r_{i-1}(j)] + q'_{i-1}(j)\}$$

For a sub-problem $S(i,c)$, some embodiments decide the bitrate level for i-th tile, aiming at maximizing the overall weighted quality. The variable j is used to denote the bitrate level which is in range [1, M]. The variable $r_{i-1}(j)$ is the bitrate of the i-th tile at the j-th bitrate level, the variable $q'_{i-1}(j)$ is the weighted quality gap between the j-th bitrate level and lowest bitrate level for the i-th tile. Note that, in some examples, ABR process 310 should at least request the lowest bitrate level for each tile. The result $K[i][c]$ is the maximum overall weighted quality can be achieved for sub-problem $S(i,c)$.

To calculate K[i][c], ABR process 310 calculates the overall weighted quality for each bitrate level of the i-th tile. Then, ABR process 310 selects the highest one as the optimum choice. If ABR process 310 selects the j-th bitrate level for the i-th tile, the overall weighted quality is calculated as the sum of the overall weighted quality of sub-problem S(i−1, c−$r_{i-1}$(j)) and $q'_{i-1}$(j).

To obtain the result of K[i][c], ABR process 310 calculates the overall weighted quality for each bitrate level of the i-th tile. Then, ABR process 310 selects the highest quality for each tile as the best choice. ABR process 310 selects the j-th bitrate level for the i-th tile, ABR process 310 calculates the overall weighted quality as the sum of the overall weighted quality of sub-problem S(i−1, c−$r_{i-1}$(j)) and $q'_{i-1}$(j).

ABR process 310 may use a prefix table $\mathcal{P}$ to record the best choice of each sub-problem, which is updated as:

$$\mathcal{P}[i][c] = \arg\max_{j \in [1,M]} \{\mathcal{P}[i-1][c - r_{i-1}(j)] + q'_{i-1}(j)\}$$

The prefix table stores the optimum selection for each sub-problem. Specifically, it is the bitrate level in the previous revenue table that can maximize the overall weighted quality. The prefix table and revenue table can be calculated at the same time, such as when ABR process 310 calculates the highest overall weighted quality, ABR process 310 selects which bitrate level to use.

In some embodiments, ABR process 310 performs the following. ABR process 310 initializes the optimal bitrate levels for tiles to a value, such as "1", which is the lowest bitrate level. ABR process 310 updates the remaining bandwidth as C'=C−$\Sigma_i r_i$(1), updates the bitrate set as the original value minus the minimum value, and updates the quality set as the original value multiplied by the viewport probability.

ABR process 310 initializes the knapsack revenue table $\mathcal{K}$ by 0 and constructs the prefix table $\mathcal{P}$. If all sub-problems are solved, ABR process 310 proceeds to find the remaining revenue budget, which described below. For a sub-problem S(i, c), ABR process 310 finds the maximum quality can be reached. Then, ABR process 310 records the bitrate level in prefix table.

When all the sub-problems are solved, ABR process 310 finds the remaining revenue budget as the maximal revenue in the sub-problems S(N, c), c ε [0, C']. If the optimal bitrate levels for all tiles are decided, ABR process 310 returns the optimal profiles, such as bitrate levels, for tiles 204. In the process, ABR process 310 finds the optimal bitrate for each tile 204 according to the prefix table and the remaining revenue budget, and then updates the remaining revenue budget.

| | |
|---|---|
| 1: | ∀i, appoints $l_i$ = 1; |
| 2: | Update the remaining throughput C' = C − $\Sigma_i r_i$(1); |
| 3: | Update the rate set by $\{r'_i(l_i) = r_i(l_i) - r_i(1)\}$; |
| 4: | Update the quality set by $\{q'_i(l_i) = p_i \times (q_i(l_i) - q_i(1))\}$; |
| 5: | Initialize knapsack revenue table $\mathcal{K} \in \mathbb{R}^{(N+1) \times C'}$ by 0; |
| 6: | Construct the prefix table $\mathcal{P} \in \mathbb{Z}^{(N+1) \times C'}$; |
| 7: | for i from 1 to N do |
| 8: |   for c ∈ [0, C'] do |
| 9: |     $\mathcal{K}_{i,c} = \max_{j \in [1,M]}\{\mathcal{K}_{i-1, c - r'_{i-1}(j)} + q'_{i-1}(j)\}$; |
| 10: |     $\mathcal{P}_{i,c} = \arg\max_{j \in [1,M]}\{\mathcal{P}_{i-1, c - r'_{i-1}(j)} + q'_{i-1}(j)\}$; |
| 11: |   end for |
| 12: | end for |
| 13: | Find $\hat{C}$ = arg max c ∈ [0, C']$\{\mathcal{K}_{N, c}\}$; |
| 14: | for i from N to 1 do |
| 15: |   $l_i = \mathcal{P}_{i, \hat{C}}$; |
| 16: |   $\hat{C} = \hat{C} - r'_i(l_i)$; |
| 17: | end for |
| 18: | return $\{l_i\}$ |

Example Embodiments

In some embodiments, a method comprising: receiving, by a computing device, a probability distribution of a likelihood that a user might view one or more tiles in one or more segments of a video, wherein the video is encoded in different profiles that are associated with different bitrates; determining, by the computing device, an available bandwidth; selecting, by the computing device, a profile for each tile in a segment of the video based on the available bandwidth and the probability distribution for the tiles; and sending, by the computing device, a request for a respective profile for each tile for playback of the segment of the video.

In some embodiments, the video is a 360-degree video in which a first portion of the tiles are viewed in a viewport and a second portion are not viewed in the viewport.

In some embodiments, the probability distribution is based on viewing information from a plurality of users that viewed the video.

In some embodiments, the probability distribution is based a viewport focus from a plurality of users that viewed the video.

In some embodiments, the probability distribution includes probabilities that the one or more tiles might be viewed for the one or more segments.

In some embodiments, selecting the profile for each tile in the segment of the video based on the available bandwidth and the probability distribution for the tiles comprises: selecting profiles for tiles to maximize bitrates selected within the available bandwidth based on the probability distribution for the tiles.

In some embodiments, selecting the profile for each tile in the segment of the video based on the available bandwidth and the probability distribution for the tiles comprises: selecting a first profile with a higher bitrate compared to a second profile for a first tile when the first tile is associated with a higher probability in the probability distribution.

In some embodiments, selecting the profile for each tile in the segment of the video based on the available bandwidth and the probability distribution for the tiles comprises: selecting a first set of profiles for a first set of tiles and a second set of profiles for a second set of tiles, wherein the first set of profiles are associated with a first bitrate and the second set of tiles are associated with a second bitrate.

In some embodiments, sending the request for the respective profile for each tile for playback of the segment of the video comprises: requesting multiple profiles associated with different bitrates for different tiles in the segment.

In some embodiments, the method further comprising: requesting a lowest bitrate profile of the video and the respective profile for each tile for playback of the segment of the video.

In some embodiments, a method comprising: receiving, by a computing device, viewport positioning information for a plurality of users in a video, wherein the viewport positioning information is used to identify one or more tiles in one or more segments in the video; aggregating, by the computing device, the viewport positioning information for each tile in each of the one or more segments; generating, by the computing device, a probability distribution of a probability a user might view the one or more tiles in the one or more segments; and sending, by the computing device, the probability distribution of the probability for a segment for use in selecting one of a plurality of profiles for tiles in the segment during playback of the segment of the video.

In some embodiments, the video is a 360-degree video in which a first portion of the tiles are viewed in a viewport and a second portion are not viewed in the viewport.

In some embodiments, aggregating the viewport positioning information for each tile comprises: aggregating views of tiles for the plurality of users, wherein the aggregated views are used to generate the probability distribution.

In some embodiments, the method further comprising: encoding the one or more segments in one or more profiles that are associated with different bitrates.

In some embodiments, a media player selects a profile for each tile in a segment of the video based on an available bandwidth and the probability distribution for the tiles.

In some embodiments, the method further comprising: receiving a selection for a profile for each tile in a segment of the video, wherein the selection calculated based on an available bandwidth and the probability distribution for the tiles.

In some embodiments, a non-transitory computer-readable storage medium having stored thereon computer executable instructions, which when executed by a computing device, cause the computing device to be operable for: receiving a probability distribution of a likelihood that a user might view one or more tiles in one or more segments of a video, wherein the video is encoded in different profiles that are associated with different bitrates; determining an available bandwidth; selecting a profile for each tile in a segment of the video based on the available bandwidth and the probability distribution for the tiles; and sending a request for a respective profile for each tile for playback of the segment of the video.

In some embodiments, the probability distribution is based on viewing information from a plurality of users that viewed the video.

In some embodiments, the probability distribution is based a viewport focus from a plurality of users that viewed the video.

In some embodiments, the probability distribution includes probabilities that the one or more tiles might be viewed for the one or more segments.

System

Figure 7:
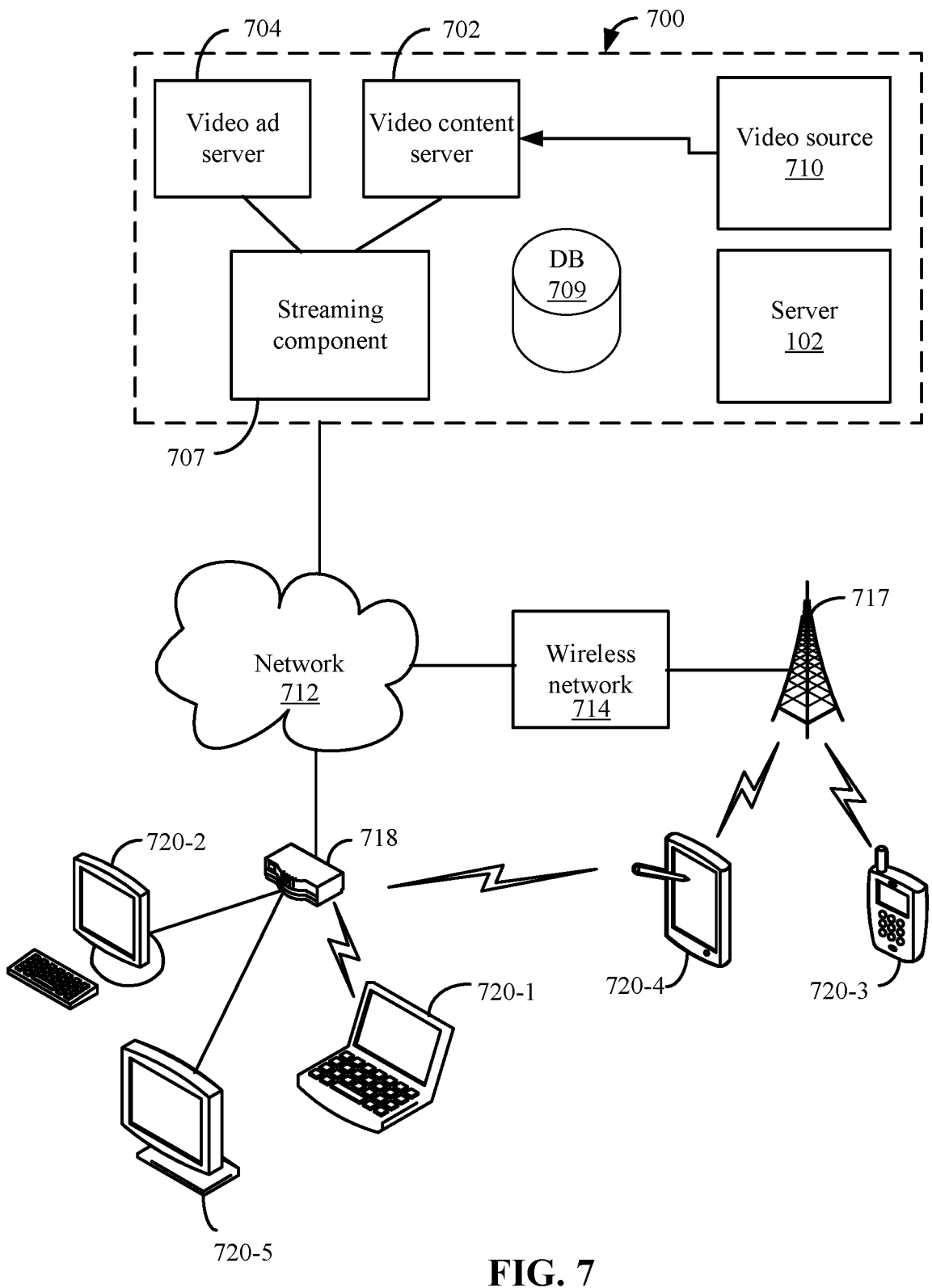
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or encoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from server 102. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
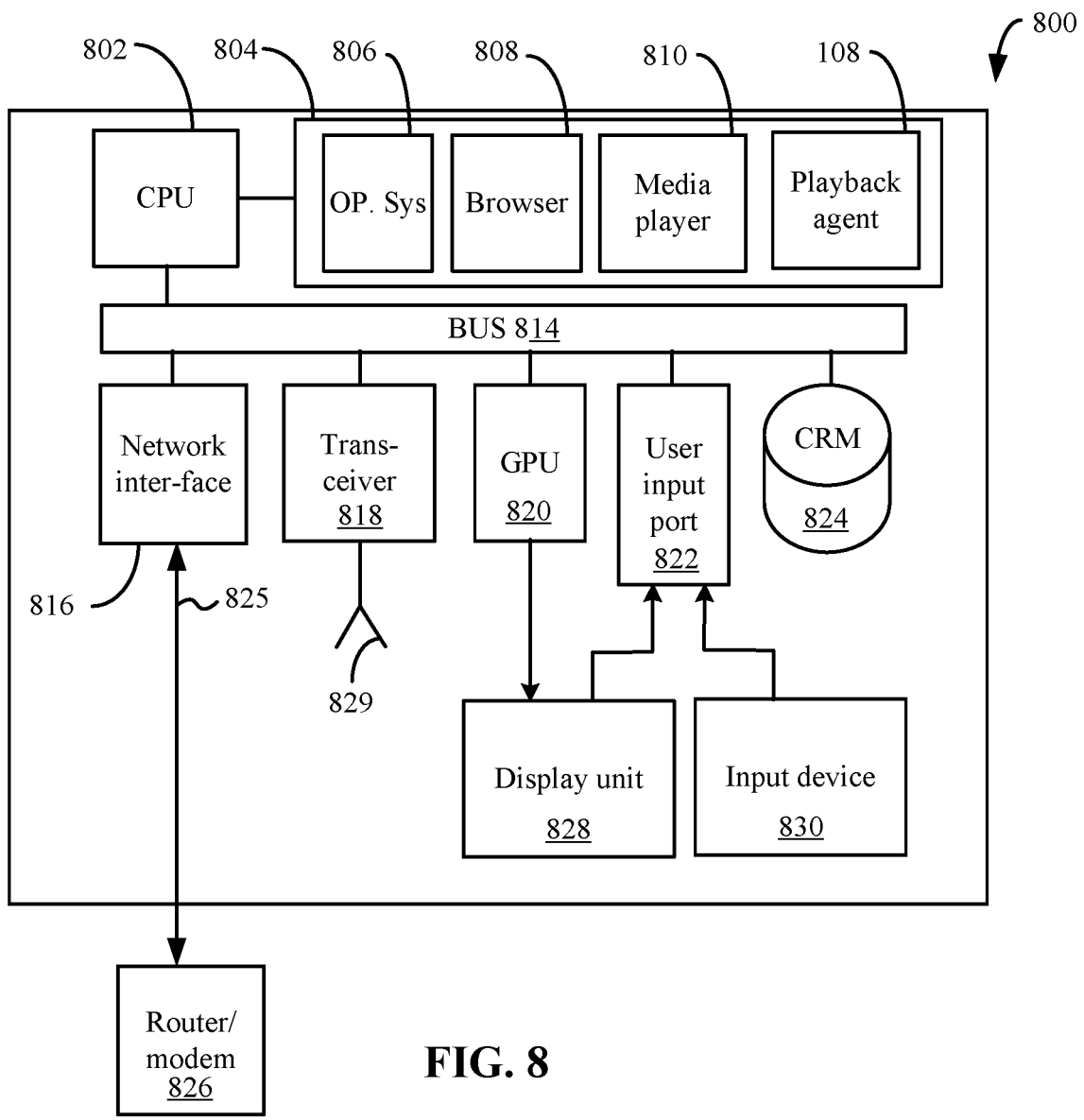
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include playback agent 108 The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, a probability distribution of a likelihood that a viewport of a user might view one or more tiles in one or more segments of a video, wherein the video is encoded in a plurality of profiles that are associated with a plurality of bitrates, and wherein the probability distribution is based on viewing information from viewports of a plurality of users other than the viewport of the user associated with a playback of the video;
    determining, by the computing device, an available bandwidth;
    during playback of the video, selecting, by the computing device, a profile for playback of a segment of the video from the plurality of profiles for each tile in the segment of the video based on the available bandwidth and the probability distribution for the tiles, wherein the selecting using the probability distribution does not use a current viewport fixation of the viewport that is viewing the video;
    sending, by the computing device, a request for a respective profile for each tile for playback of the segment of the video to a server; and
    receiving, by the computing device, the segment of video from the server for playback.

2. The method of claim 1, wherein the video is a 360-degree video in which a first portion of the tiles are viewed in the viewport and a second portion are not viewed in the viewport.

3. The method of claim 1, wherein the probability distribution is based a viewport focus of the viewport from the plurality of users.

4. The method of claim 1, wherein the probability distribution includes probabilities that the one or more tiles might be viewed for the one or more segments.

5. The method of claim 1, wherein selecting the profile for each tile in the segment of the video based on the available bandwidth and the probability distribution for the tiles comprises:
    selecting profiles for tiles to maximize bitrates selected within the available bandwidth based on the probability distribution for the tiles.

6. The method of claim 1, wherein selecting the profile for each tile in the segment of the video based on the available bandwidth and the probability distribution for the tiles comprises:
    selecting a first profile with a higher bitrate compared to a second profile for a first tile when the first tile is associated with a higher probability in the probability distribution.

7. The method of claim 1, wherein selecting the profile for each tile in the segment of the video based on the available bandwidth and the probability distribution for the tiles comprises:
    selecting a first set of profiles for a first set of tiles and a second set of profiles for a second set of tiles, wherein the first set of profiles are associated with a first bitrate and the second set of tiles are associated with a second bitrate.

8. The method of claim 1, wherein sending the request for the respective profile for each tile for playback of the segment of the video comprises:
   requesting multiple profiles associated with different bitrates for different tiles in the segment.

9. The method of claim 1, further comprising:
   requesting a lowest bitrate profile of the video and the respective profile for each tile for playback of the segment of the video.

10. A method comprising:
   receiving, by a computing device, viewport positioning information in a video for a plurality of viewports of a plurality of users other than a user that is viewing the video;
   aggregating, by the computing device, the viewport positioning information for each tile in each of one or more segments of the video;
   generating, by the computing device, a probability distribution of a probability that a viewport of the user might view the one or more tiles in the one or more segments; and
   sending, by the computing device, the probability distribution of the probability for a segment to a client for use in selecting one of a plurality of profiles that are available for playback for tiles in the segment to request for playback of the segment of the video, wherein the selecting that uses the probability distribution does not use a current viewport fixation of the viewport that is viewing the video.

11. The method of claim 10, wherein the video is a 360-degree video in which a first portion of the tiles are viewed in the viewport and a second portion are not viewed in the viewport.

12. The method of claim 10, wherein aggregating the viewport positioning information for each tile comprises:
   aggregating views of tiles for the plurality of viewport, wherein the aggregated views are used to generate the probability distribution.

13. The method of claim 10, further comprising:
   encoding the one or more segments in the plurality of profiles, wherein the plurality of profiles are associated with a plurality of bitrates.

14. The method of claim 10, wherein a media player selects a profile from the plurality of profiles for each tile in a segment of the video based on an available bandwidth and the probability distribution for the tiles.

15. The method of claim 10, further comprising:
   receiving a selection for a profile for each tile in a segment of the video, wherein the selection is calculated based on an available bandwidth and the probability distribution for the tiles.

16. A non-transitory computer-readable storage medium having stored thereon computer executable instructions, which when executed by a computing device, cause the computing device to be operable for:
   receiving a probability distribution of a likelihood that a viewport of a user might view one or more tiles in one or more segments of a video, wherein the video is encoded in a plurality of profiles that are associated with a plurality of bitrates, and wherein the probability distribution is based on viewing information from viewports of a plurality of users other than the viewport of the user associated with a playback of the video;
   determining an available bandwidth;
   during playback of the video, selecting a profile for playback of a segment of the video from the plurality of profiles for each tile in the segment of the video based on the available bandwidth and the probability distribution for the tiles, wherein the selecting using the probability distribution does not use a current viewport fixation of the viewport that is viewing the video;
   sending a request for a respective profile for each tile for playback of the segment of the video to a server; and
   receiving the segment of video from the server for playback.

17. The non-transitory computer-readable storage medium of claim 16, wherein the probability distribution is based a viewport focus of the viewport from the plurality of users.

18. The non-transitory computer-readable storage medium of claim 16, wherein the probability distribution includes probabilities that the one or more tiles might be viewed for the one or more segments.

19. The method of claim 1, wherein the probability distribution is received during playback of the video.

20. The method of claim 1, wherein the probability distribution is received for a segment after a current segment being viewed in the video.

21. The method of claim 1, wherein the probability distribution that is received is dynamically calculated during playback of the video.

* * * * *